United States Patent [19]
Rinaldi et al.

[11] Patent Number: 5,150,070

[45] Date of Patent: Sep. 22, 1992

[54] DEMODULATOR FOR BIPHASE, SUPPRESSED-CARRIER PSK SIGNALS

[75] Inventors: Paolo Rinaldi; Federico Cecili, both of Rome, Italy

[73] Assignee: Telesia Microelecttronica S.r.l., Italy

[21] Appl. No.: 563,699

[22] Filed: Aug. 7, 1990

[30] Foreign Application Priority Data

Aug. 9, 1989 [IT] Italy ................. 48291A/89

[51] Int. Cl.$^5$ ............................. H04L 27/22
[52] U.S. Cl. .................. 329/307; 329/310; 375/81; 375/87
[58] Field of Search ............ 329/304, 306, 307, 310, 329/325, 326, 345, 346; 375/81, 83–87, 120

[56] References Cited

PUBLICATIONS

Schlemper, "Kohäventer Demodulator mit digitaler Phasenscheife", Nachrichtentech. Z. (Germany), vol. 30, No. 5, May 1977, pp. 413–416.

Cominetti, "Il Radiodata: Nuovo Servizio In Radiofonia MF", Elettronica E Telecommunicazioni, No. 2, 1985, pp. 63–75.

*Primary Examiner*—Siegfried H. Grimm
*Attorney, Agent, or Firm*—Pollock, Vande Sande & Priddy

[57] ABSTRACT

A demodulator for biphase, suppressed-carrier PSK signals, in particular useful for the demodulation of digital information transmitted as an auxiliary information in radio transmission channels, in particular of the "radiodata" kind comprising a filter for the extraction of the portion of the base band spectrum carrying said PSK signals, an amplitude limiter connected to the output of said filter for standardizing the amplitude of said PSK signals, a double-loop circuit receiving the limiter signal comprising a first loop associated with a data transition tracking loop decoder; a second loop constituted by a digital phase-locked loop. The double loop circuit cooperates with a stable oscillator for providing a frequency at a predetermined multiple of the frequency of the suppressed carrier of said PSK signal from the limiter signal.

5 Claims, 2 Drawing Sheets

DEMODULATOR FOR BIPHASE, SUPPRESSED-CARRIER PSK SIGNALS

BACKGROUND OF THE INVENTION

1. Field of the Invention

The present invention relates to a demodulator for suppressed carrier biphase PSK signals.

More in particular, the present invention relates to a demodulator for digital signals modulated in biphase PSK with suppressed carrier of the kind utilized in the transmission of digital messages on a radiobroadcast channel, in particular stereo radio broadcasting, known as "radiodata".

2. Description of the Prior Art

Recently a data transmission system has been developed known as "radiodata" in which a data transmission is performed in the frequency modulated channels of radio broadcast utilizing an auxiliary carrier at the frequency of 57 KHz corresponding to the third harmonic of the pilot carrier of the conventional stereo transmissions according to the C.C.I.R. standards, corresponding to 19 KHz. The recovery of the information transmitted with the system in question is relatively complex, as it is necessary to reconstitute the carrier at 57 Khz which is suppressed during transmission.

Several systems have been proposed for obtaining demodulation of this kind of signal: see for instance the article "IL RADIODATA: nuovo servizio in radiofonia MF" by Cominetti, Elettronica e Telecomunicazioni No. 2, 1985; "Specifications of the radiodata system RDS for VHS/FM Sound Broadcasting" - European Broadcasting Union, technical Center, Brussels, March 1984; and, "Digital Communications by Satellite", Vijay K. Bhargava et al, John Wiley & Sons, N.Y.

The aim of the present invention is to provide a demodulator and decoder of signals for transmissions of the "radiodata" kind with improved features with respect to the known art and that can be realized with purely digital techniques that can be integrated at low cost, especially in an integrated circuit for performing a number of other functions.

SUMMARY OF THE INVENTION

According to the present invention there is provided a demodulator for signals of the above cited kind comprising a filter for extracting the portion of the spectrum in the base band carrying said PSK signals; an amplitude limiter connected to the output of said filter for standardizing the amplitude of said PSK signals, a double-loop circuit comprising a first loop associated to a decoder comprising, a data transition tracking loop (DTTL); and a second loop constituted of a phase-locked loop of the digital kind. This double-loop circuit cooperates with a stable oscillator arranged for providing a frequency at a predetermined multiple of the frequency of the suppressed carrier of said PSK signals.

BRIEF DESCRIPTION OF THE DRAWINGS

The present invention will be now disclosed with reference to a preferred embodiment thereof, referred to as an non limitative example, and according to the figures of the attached drawings, wherein.

DESCRIPTION OF A PREFERRED EMBODIMENT

Figure 2:
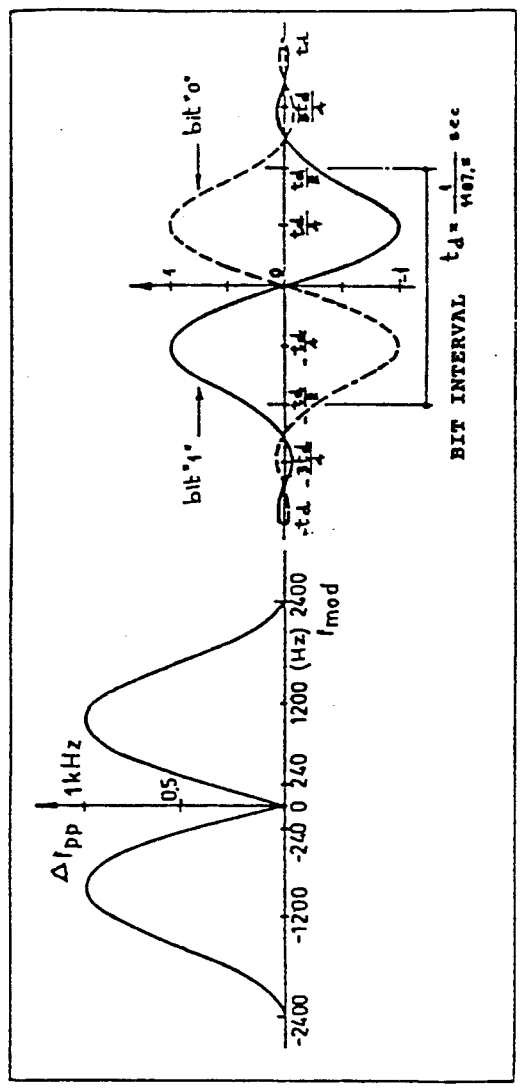
FIG. 2 shows the representation in function of time of a single biphase signal.
Figure 1:
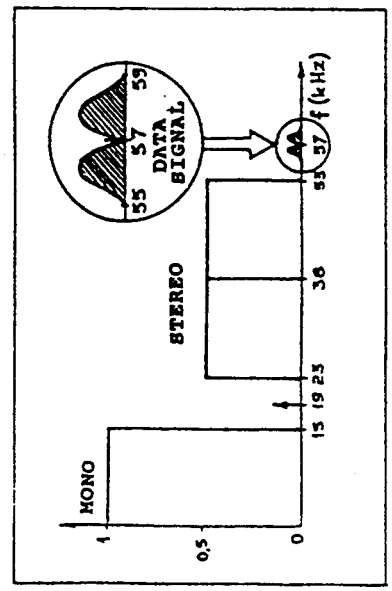
FIG. 1 shows the spectrum of typical "radiodata" signals.
Figure 3:
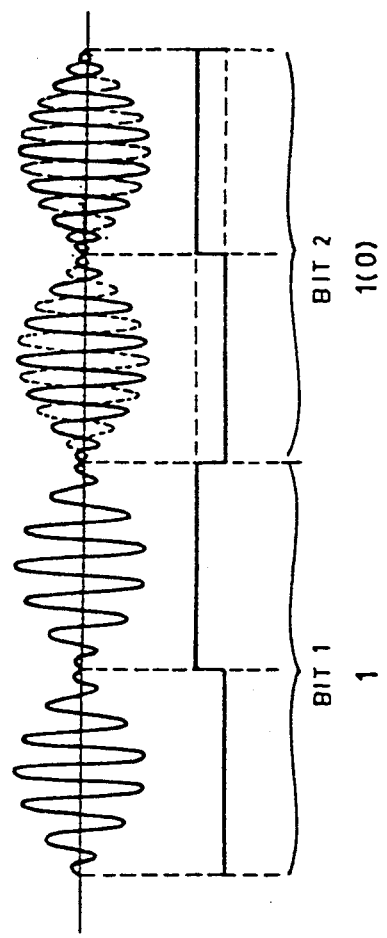
FIG. 3 shows the trend of an actual signal at the input of the circuit according to the present invention.

The diagrams shown in the FIGS. 1 to 3 have been referred to only as an illustration and as a clarification for the reader. For a detailed description thereof the reader should refer to the above mentioned publications.

Figure 4:
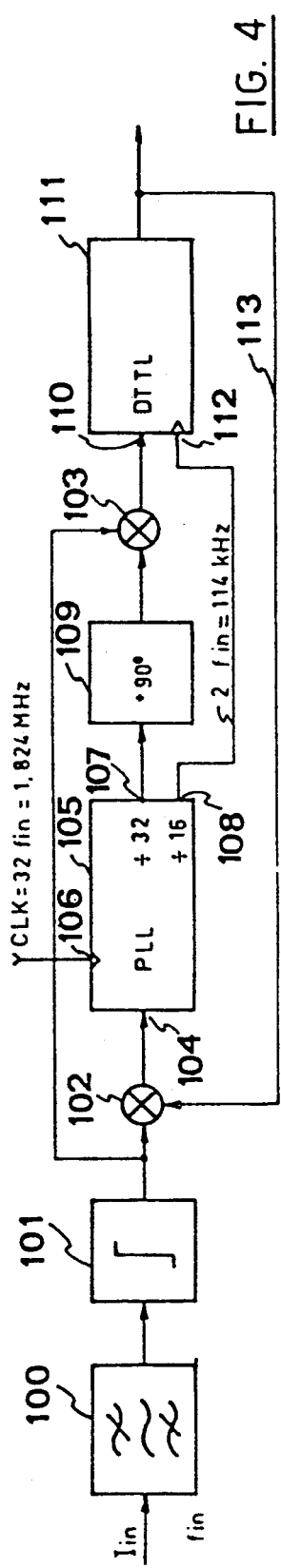
FIG. 4 shows the block diagram of the demodulator/decoder circuit according to the present invention.

With reference to FIG. 4 the demodulator and decoder circuit according to the invention will be disclosed.

The input signal, indicated in $I_{in}$, coming from a source of suppressed-carrier biphase PSK signal, in the particular case of "radiodata", centered on a nominal carrier at 57 KHz, is passed through a passband filter 100. In a specific application where it is desired to maximize integration on a chip, the filter 100 is realized according to the well known switched capacitor filter technique.

The mask and the several parameters of the filter 100 are selected according to the signal that has to be processed, and, in the case of a "radiodata" signal according to the standards that appear in the publications above mentioned.

From the filter 100, possibly after amplification, the signal is applied to the input of a symmetric hard limiter shown in 101. From the output of the limiter 101, the signal is applied to the first input of two multipliers 102, 103. The multipliers 102, 103 may be constituted as it is well known in these techniques, by gates of the XOR kind.

The output of the multiplier 102 arrives at the input 104 of a phase-locked loop 105 having a clock signal input. The clock signal in question, in the case of the reception of "radiodata" messages on a carrier centered on 57 KHz, is centered on a frequency corresponding to $(32 \times 57)$ Khz $= 1.824$ MHz and is obtained by means of a highly stable oscillator (not shown) such as for instance a crystal oscillator.

The internal structure of the PLL 105 will be better disclosed hereinafter. At this moment it is sufficient to say that on the output of the PLL 105 there are available a first and a second output indicated in 107, 108, respectively. The output 107 is at the frequency of 57 KHz and is applied to the input of a 90° phase shifter indicated in 109 that will be better shown hereinafter.

The output of the phase shifter 109 is applied to the second input of the multiplier 103, the output of which is applied to the input 110 of a decoder 111 comprising a data transition tracking loop (DTTL) that receives as a clock input 112 a signal (according to previously indicated parameters) at the frequency of 114 KHz corresponding to double the input frequency $f_{in}$. The structure of the decoder 111 is known from the publication Digital Communications by Satellite, page 153 and following, previously mentioned and will not be further disclosed into detail.

The output of the decoder 111 is brought by line 113 to the second input of the multiplier 102 for closing the loop.

Figure 5:
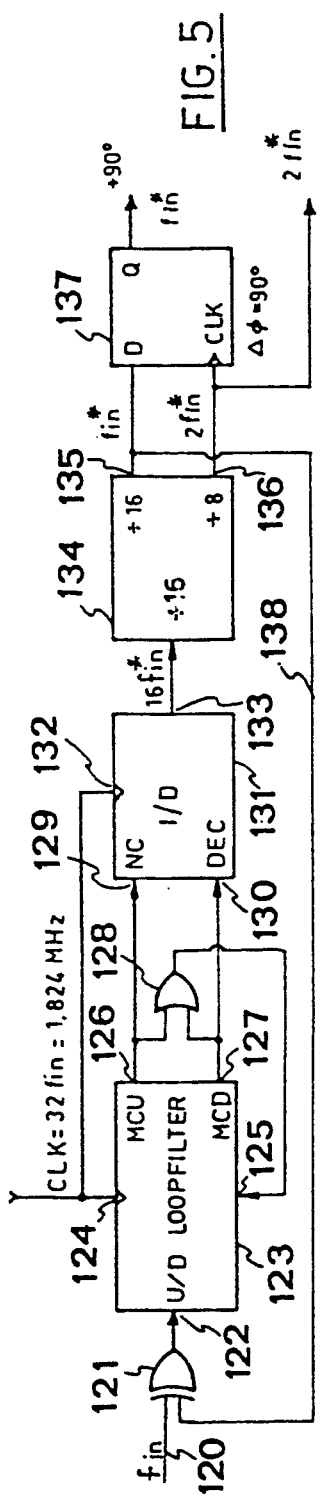
FIG. 5 shows a detailed block diagram of the significant part of the circuit of FIG. 4.

With reference now to FIG. 5, the operation of the PLL 105, considered together with the phase shifter 109, will be illustrated.

The signal coming from the output of the multiplier 102, is applied to the input 120 of an XOR gate 121, the input 120 corresponding to the input 104 of FIG. 4. The output of the XOR gate 121 is applied to the input 122 of up/down control of a bidirectional counter 123. The counter 123 is preferably a bidirectional counter with 10–12 stages provided with a count-input 124, a reset input 125, and an output of maximum count up and maximum count down, shown respectively in 126, 127. It should be noted that these outputs 126, 127 are not equivalent to the "overflow" and "underflow" outputs. In other words, an output on the terminal 126 will indicate the status of the counter corresponding to "111 .. . 110" and on the terminal 127 corresponding top "000 ... 001", respectively.

If this count is surpassed, the one or the other signal provided by terminals 126, 127, will be combined in the OR gate 128 and will arrange for the (dynamic) reset of the counter 123. The outputs 126, 127 now mentioned are applied to the increment and decrement inputs 129, 130 of an increment/decrement circuit shown in 131 and driven in 132 by the same clock signal at 32 $f_{in}=1.824$ MHz. The increment/decrement circuit 131 is realized according to the cycle-adding and cycle-stealing techniques according to the direction requested for the correction.

It should be noted that the circuit 131 makes part of a "PLL" with a clock at a frequency that is a multiple of the lock frequency: $f_{in}=57$ KHz; $f_{clock}=32\ f_{in}=1.824$ MHz and consequently by means of the above said cycle-adding and cycle-stealing discrete corrections are obtained corresponding to about $360/32=11°$. Consequently at the steady state condition, the output 135 of the divider 134 will have a "hunting" around $\pm 11°$ (a frequency variation in a signal subjected to a division is reduced, with a sufficient divisional ratio, to an angle or phase variation).

Figure 6:
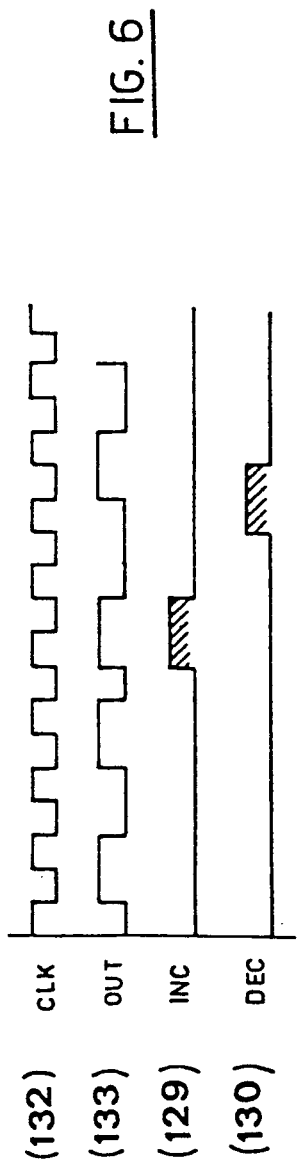
FIG. 6 shows waveforms illustrative of the operation of a circuit element of FIG. 5.

This process is shown in FIG. 6 where significant wave forms are shown, as well as, the effects of the correction signals INC and DEC on the output of the increment/decrement circuit 131, respectively.

The signals present in 133, 135, 136 and on the Q output of the flip-flop 137 are indicated with an asterisk (*) because these are signals that only in a statistical sense have the indicated frequency.

The signal at $f^*_{in}$ present on the terminal 135 is connected by line 138 to the second input of the XOR gate 121 for closing the loop of the digital PLL. It is deemed not necessary to provide a further detailed disclosure of the circuit because it embodies circuit solutions that are well described in the above mentioned publication, "Digital Communication by Satellite".

Even if the present invention has been disclosed with reference to the demodulation of signals of the "radiodata" kind, it will be clear to a person skilled in the art that the system according to the present invention may be applied also in other circumstances, and will be also clear that a person skilled in the art may introduce changes and modifications to what has been disclosed hereinbefore without departing from the scope of the present invention.

We claim:

1. A demodulator suitable for the demodulation of digital information transmitted as a suppressed carrier biphase PSK auxiliary signal in a radio transmission channel comprising:
   a filter for extracting a portion of signal spectrum carrying said PSK signal;
   an amplitude limiter connected to said filter for limiting the amplitude of said PSK signal;
   a double loop circuit comprising:
      a first multiplier having a first input connected to said limiter, and a second input;
      a digital phase locked loop having an input connected to said first multiplier output and a clock input connected to receive a stable clock signal, said digital phase locked loop producing, respectively, first and second signals at the frequency of said suppressed carrier and at a frequency of twice said suppressed carrier;
      a ninety degree phase shift circuit connected to receive said first signal;
      a second multiplier connected to receive a signal from said phase shift circuit and a signal from said limiter; and,
      a data transition tracking loop decoder connected to receive a signal from said second multiplier and said second signal from said phase locked loop, said decoder providing a demodulated signal to said first multiplier second input.

2. A demodulator according to claim 1, wherein said digital phase-locked loop comprises an XOR circuit having a first input connected to said first multiplier, and an output connected to an increment/decrement control input of a bidirectional counter whose clock input is connected to receive said stable clock signal, said bidirectional counter being provided with a maximum count-up output and a maximum count-down output connected to the input of an OR circuit, whose output is connected to a reset input of said bidirectional counter, said maximum up-count output and maximum down-count output being connected to an increment/decrement circuit, the output of said increment/decrement circuit being connected to a divider producing a first signal having a frequency equal to the nominal input signal frequency, said first signal being connected to a second input of said XOR circuit.

3. A demodulator according to claim 2, wherein said divider circuit provides a second signal at a frequency twice said nominal frequency, the first signal and the second signal being connected, respectively, to the data input and to the clock input of a D-type flip-flop which produces a signal at said nominal frequency shifted by 90° with respect to said divider first signal frequency.

4. A demodulator according to claim 1, wherein said filter comprises a switched capacitor filter.

5. A demodulator according to claim 1, wherein said limiter is a hard limiter.

* * * * *